United States Patent
McEvoy et al.

(10) Patent No.: US 6,814,568 B2
(45) Date of Patent: Nov. 9, 2004

(54) SUPERATMOSPHERIC COMBUSTOR FOR COMBUSTING LEAN CONCENTRATIONS OF A BURNABLE GAS

(75) Inventors: Lawrence J. McEvoy, Martinsville, NJ (US); John G. Jacobsen, deceased, late of Shorthills, NJ (US); by Eric Jacobsen, legal representative, Rutherford, NJ (US); by Krista Jacobsen, legal representative, Basking Ridge, NJ (US)

(73) Assignee: Foster Wheeler USA Corporation, Clinton, NJ (US)

( * ) Notice: Subject to any disclaimer, the term of this patent is extended or adjusted under 35 U.S.C. 154(b) by 353 days.

(21) Appl. No.: 09/905,877

(22) Filed: Jul. 17, 2001

(65) Prior Publication Data

US 2002/0020364 A1 Feb. 21, 2002

Related U.S. Application Data

(60) Provisional application No. 60/221,137, filed on Jul. 27, 2000.

(51) Int. Cl.[7] ................................................. F23D 11/44
(52) U.S. Cl. ........................ 431/11; 431/161; 431/243; 431/247
(58) Field of Search ................................ 431/160, 161, 431/162, 164, 166, 167, 207, 238, 243, 247, 11, 10, 7

(56) References Cited

U.S. PATENT DOCUMENTS

| | | | |
|---|---|---|---|
| 2,753,925 A | 7/1956 | Campbell et al. ............... | 158/1 |
| 3,229,746 A | 1/1966 | Wagner et al. ................. | 158/7 |
| 3,244,220 A | 4/1966 | Kloecker | |
| 3,468,616 A * | 9/1969 | Ward .......................... | 431/166 |
| 3,747,542 A | 7/1973 | Ruohola et al. ............... | 110/8 |
| 3,837,813 A | 9/1974 | Ebeling et al. ............... | 23/277 |
| 3,940,253 A | 2/1976 | Zetterström | |
| 4,009,080 A | 2/1977 | Kurokawa et al. ............. | 201/29 |
| 4,010,094 A | 3/1977 | McKinney ................... | 208/164 |
| 4,140,480 A | 2/1979 | Kaiser et al. ................. | 432/22 |
| 4,145,033 A | 3/1979 | Kuntziger .................... | 266/44 |
| 4,249,470 A | 2/1981 | Vatsky | |
| 4,255,122 A | 3/1981 | Alpkvist et al. | |
| 4,255,136 A | 3/1981 | Suzuki et al. ................ | 432/143 |
| 4,255,927 A * | 3/1981 | Johnson et al. ............. | 60/39.23 |
| 4,309,024 A | 1/1982 | Lillybeck et al. ........... | 266/138 |

(List continued on next page.)

FOREIGN PATENT DOCUMENTS

| | | |
|---|---|---|
| DE | 23 50 258 | 4/1975 |
| EP | 0 826 924 A2 | 4/1988 |

OTHER PUBLICATIONS

International Search Report PCT/US 01/233706, Foster Wheeler USA Corporation.*

*Primary Examiner*—Carl D. Price
(74) *Attorney, Agent, or Firm*—Fitzpatrick, Cella, Harper & Scinto

(57) ABSTRACT

A superatmospheric combustion apparatus and a method of operating such an apparatus include providing a superatmospheric combustion device having a lean gas chamber, a combustor, a heat recovery section, and an exhaust, feeding lean gas to the lean gas chamber, providing a heat sink/pressure equalization chamber and a preheated air chamber within the combustion device, feeding pressurized ambient air to the heat sink/pressure equalization chamber, feeding preheated air to the preheated air chamber, exchanging heat from the lean gas chamber, the preheated air chamber, and the combustor to the pressurized ambient air in the heat sink/pressure equalization chamber, feeding the lean gas from the lean gas chamber to the combustor, feeding the preheated air from the preheated air chamber to the combustor, and combusting the lean gas and the preheated air in the combustor at superatmospheric pressure.

28 Claims, 12 Drawing Sheets

U.S. PATENT DOCUMENTS

| | | |
|---|---|---|
| 4,346,302 A | 8/1982 | Bozzuto .................... 290/1 |
| 4,435,152 A | 3/1984 | Struck et al. ............ 431/170 |
| 4,533,314 A | 8/1985 | Herberling ................. 431/4 |
| 4,541,864 A | 9/1985 | Ratschat ................... 75/41 |
| 4,657,504 A * | 4/1987 | Akiyama et al. ......... 431/166 |
| 5,413,477 A * | 5/1995 | Moreland .................. 431/9 |
| 5,518,524 A | 5/1996 | Wilson et al. ............. 75/585 |
| 5,782,957 A | 7/1998 | Rinker et al. ............. 75/436 |
| 5,901,653 A | 5/1999 | Jennebach et al. ........ 110/213 |
| 5,957,678 A | 9/1999 | Endoh et al. |

\* cited by examiner

SUPERATMOSPHERIC COMBUSTOR FOR COMBUSTING LEAN CONCENTRATIONS OF A BURNABLE GAS

RELATED APPLICATION

This application claims the benefit of U.S. Provisional Application No. 60/221,137, filed Jul. 27, 2000.

FIELD OF THE INVENTION

This invention relates to a method of and an apparatus for combusting lean concentrations of a burnable gas at superatmospheric pressure, and more particularly to such a combustion arrangement having a heat sink/pressure equalization chamber for protecting the combustor from back pressure generated during the combustion process.

BACKGROUND OF THE INVENTION

U.S. Pat. No. 3,229,746 (the '746 patent), which is incorporated by reference herein in its entirety, shows a heat recovery apparatus and a method suitable for combusting lean concentrations of a burnable gas. That patent, by way of example, is directed to the burning of lean gases such as, but not limited to, catalytic cracking off gas containing carbon monoxide concentrations of less than 8%. The invention in that patent permits the stabilizing of carbon monoxide ignition at a temperature in the range of from 1200° F. to 1500° F. After start-up, this temperature can be maintained in most cases by the combustion of the carbon monoxide alone. In the remaining cases, there is a minimal auxiliary fuel requirement to assure safe ignition and/or to maintain the desired amount of heat recovery.

FIG. 1 of this application shows the heat recovery apparatus of the '746 patent. In FIG. 1, a setting generally designated by reference numeral 1 defines a combustion zone 2 and a heat recovery zone 3 horizontally disposed at grade level. Gas is communicated to the combustion zone 2 via gas chamber 4 and gas ports 6. Air is introduced via air chamber 7. The air enters the combustion chamber 2 through air ports 8. Secondary air to support the combustion of auxiliary fuel is admitted to the combustion chamber through conduits 9. The gas and air are intermittently commingled by opposing vortexes indicated by directing arrows 11 and 12 created by an aiming device shown as inclined conduits 13, which conduct the gas mixture from the gas chamber 4 to the gas ports 6 and short air pipes 14. Auxiliary burners 16 are provided to initially heat the gases in the combustion zone 2 to a suitable kindling temperature. Refractory material 17 lines the combustion zone 2 to re-radiate heat to the gases therein.

By the arrangement shown in FIG. 1, lean gas such as carbon monoxide in concentrations of less than 8%, such as catalytic cracking off gas, can be burned. Higher concentrations, of course, can be combusted more easily. An outstanding feature of the design shown in FIG. 1 is that it requires less than 1% of excess oxygen as measured in the products of combustion.

In the combustion chamber 2, a temperature in the range of from 1200° F. to 1500° F. can conveniently be maintained so that after light-off, carbon monoxide will usually be able to burn without the need for auxiliary fuel. Heat is liberated by the burning of carbon monoxide in the combustion zone 2. Intrinsically, there is a heat liberating system operating in the combustion chamber 2. In an extrinsic sense, the combustion zone 2 has been designed so that there is practically no heat input or heat removal to the combustion zone 2 vis-a-vis its surroundings. In particular, no cooling devices, such as heat exchange tubes, are associated with the combustion zone 2.

An end wall 18 is defined by a partition 19. Air ports 8 and gas ports 6 penetrate the partition 19 to define substantially concentric angular groups in the end wall 18. FIG. 1 shows an open checker brick wall 21 as a canalizing device, which causes the combustion gases to flow through restricted canals 22 to thereby increase commingling. The heat recovery zone 3 is defined by the setting 1 downstream of the combustion zone 2. An appropriate heat recovery apparatus, such as steam tubes, an economizer, a superheater, other fluid streams, and the like, can be provided in the heat recovery zone 3.

The setting 1 defines an enclosure for the combustion zone 2 having end walls and side walls extending between the end walls. All of the walls are arranged to re-radiate heat to the combustion zone via the refractory material 17. The exhaust port by which the hot gases are transmitted to the heat recovery zone 3 is at an end of the setting 1, opposite from the gas ports 6 and air ports 8, and constitutes a sufficiently small portion of one of the side walls to maintain re-radiation of heat from all walls of the enclosure at the highest level possible.

In addition, as shown in FIG. 1, the heat recovery zone 3, which is the only heat sink structure of the apparatus, is completely removed from exposure to the combustion zone 2. This is in comparison to conventional carbon monoxide boiler installations where a heat sink in the form of water tubes either is in the combustion zone or is exposed to radiant heat of the burning gases. Such an internal heat sink increases the requirement for auxiliary fuel and reduces to a marked extent flame stability and reliability of carbon monoxide gas conversion.

The apparatus shown in FIG. 1 typically operates at high temperatures. For example, the typical lean gas is fed to the apparatus at 600° F. to 1100° F. or higher. As a result of the combustion process, the combusted gases exiting the combustion zone can be in the range of 1200° F. to 1800° F. or higher.

FIGS. 2 and 3 show prior art apparatuses that adequately avoid overheating of the external casing plates thereof, which are respectively insulated on the lean gas chamber and the combusted gas chamber, by using a flow of pressurized ambient ("cold") air to an air chamber, which is formed and contained by these chambers. In such arrangements, the pressurized ambient air is utilized as the oxidant source to combust both the lean gas and an auxiliary fuel stream in the apparatus.

FIG. 2 shows a conventional combustion device 200, which includes a lean gas chamber 212, a combustor 230, a heat recovery zone 240, and an exhaust 250. Ambient air is pressurized and fed by an air pump 220 through a supply line 221 to the combustor 230. Lean gas 210 is supplied through a supply line 211 to the lean gas chamber 212.

FIG. 3 shows in more detail a combustion device 300. The combustion device 300 includes a lean gas chamber 312 and a combustor 330. Lean gas from lean gas chamber 312 enters the combustor 330 through a gas port 317. Pressurized ambient air 320 enters the combustor 330 through an air port 327. The combustion device 300 is insulated by a refractory lining 301. Combustion products exit the combustor 330 and are sent to a heat recovery section 340, typically through a heat exchanger (not shown).

One having ordinary skill in the art will appreciate that a suitable number of auxiliary burners 16 (shown in FIG. 1)

may be provided as start-up means to initially heat the gases in the combustor 230 (FIG. 2) or 330 (FIG. 3) to a desired kindling temperature, or as a means to provide a level of heat input for the desired heat recovery.

As discussed above, such apparatuses are most typically used in processes where the lean gas is delivered to the apparatus at some pressure above atmospheric pressure (for example, 0.1 psig to 5.0 psig or higher), and the combusted gases typically are discharged to the atmosphere after heat recovery and, in some instances, after exhaust gas clean-up systems. This, however, results in a back pressure within the combustion zone. As noted in FIG. 2, air is supplied to the apparatus with a pump to meet the pressure requirements. The apparatus, of course, is designed to contain and withstand these internal pressures. The advantage of the configuration of such an apparatus is the economics of its construction for the pressure containment discussed above, resulting from integration of the gas chamber and air chamber within the overall pressure container. Thus, only nominal pressure differentials exist between the respective chambers.

We have found, however, that a problem arises in the conventional arrangement shown in FIG. 3. In that embodiment, the ambient air is used to cool the refractory lining 301 of the combustor 330. Thus, the lean gas chamber 312 and the combustor 330 are in contact with the ambient air 320. Nevertheless, some applications require that the ambient air 320 be preheated prior to combustion. When this occurs, the temperature of the ambient air 320 will no longer be sufficient to cool the refractory lining 301. In turn, problems arise in cooling the chambers, resulting in expansion and structural instability of those chambers.

Indeed, we have found that, for process and energy conservation reasons, the air supply should be preheated, to about 200° F. to 600° F. or higher. In these cases we have found that the air chamber containment as previously defined will no longer provide sufficient cooling to avoid technical problems. Accordingly, a need has arisen to provide a superatmospheric combustion device having an internal heat sink/pressure equalization chamber.

SUMMARY OF THE INVENTION

An object of this invention is to provide for the use of preheated combustion air, while retaining the construction advantages of minimal pressure differentials between the respective gas and air chambers.

Another object of this invention is to provide a superatmospheric combustion device having an internal heat sink/pressure equalization chamber. Yet another object of the invention is to provide such a combustion device for use with preheated combustion air.

In one aspect, the present invention provides a method of operating a superatmospheric combustion device. The method includes providing a superatmospheric combustion device, which includes a lean gas chamber, a combustor, a heat recovery section, and an exhaust, feeding lean gas to the lean gas chamber, providing a heat sink/pressure equalization chamber and a preheated air chamber within the combustion device, feeding pressurized ambient air to the heat sink/pressure equalization chamber, feeding preheated air to the preheated air chamber, exchanging heat from the lean gas chamber, the preheated air chamber, and the combustor to the pressurized ambient air in the heat sink/pressure equalization chamber, feeding the lean gas from the lean gas chamber to the combustor, feeding the preheated air from the preheated air chamber to the combustor, and combusting the lean gas and the preheated air in the combustor at superatmospheric pressure.

In another aspect, the present invention provides a superatmospheric combustion apparatus that includes a superatmospheric combustion device having a lean gas chamber, a combustor, a heat recovery section, and an exhaust, a lean gas feed for feeding lean gas to the lean gas chamber, a heat sink/pressure equalization chamber and a preheated air chamber within the combustion device, a pressurized ambient air feed for feeding pressurized ambient air to the heat sink/pressure equalization chamber, a preheated air feed for feeding preheated air to the preheated air chamber, a lean gas port for feeding the lean gas from the lean gas chamber to the combustor, and a preheated air port for feeding the preheated air from the preheated air chamber to the combustor. The heat sink/pressure equalization chamber exchanges heat from the lean gas chamber, the preheated air chamber, and the combustor to the pressurized ambient air in the heat sink/pressure equalization chamber, and the lean gas and the preheated air are combusted in the combustor at superatmospheric pressure.

In the present invention, the preheated air chamber can be nested within the heat sink/pressure equalization chamber.

The present invention includes pressurizing the ambient air to a pressure of about 0.1 psig to about 10.0 psig, and more preferably, to a pressure of about 0.1 psig to about 5.0 psig.

The invention also includes preheating the preheated air to a temperature of about 200° F. to about 1000° F., and more preferably, to temperature of about 200° F. to 600° F.

The invention also can include increasing the temperature of the pressurized ambient air exiting the heat sink/pressure equalization chamber to a temperature of not more than about 500° F., and more preferably, to a temperature of not more than about 300° F.

The invention also can include a heat exchanger in the heat recovery section of the combustion device for preheating the preheated air, in which case, the pressurized ambient air can be discharged from the heat sink/pressure equalization chamber and fed to the heat exchanger. In another aspect, a heat source external to the combustion device can be used to preheat the preheated air, in which case the pressurized ambient air from the heat sink/pressure equalization chamber can be discharged and fed to the external heat source.

These and other features, objects and advantages of the invention will become apparent upon consideration of the following detailed description of the invention, the appended claims, and the several views of the invention, which are illustrated in the drawings.

BRIEF DESCRIPTION OF THE DRAWINGS

Like reference numerals have been used for like or corresponding elements throughout the views.

DETAILED DESCRIPTION OF THE PREFERRED EMBODIMENTS

Figure 4:
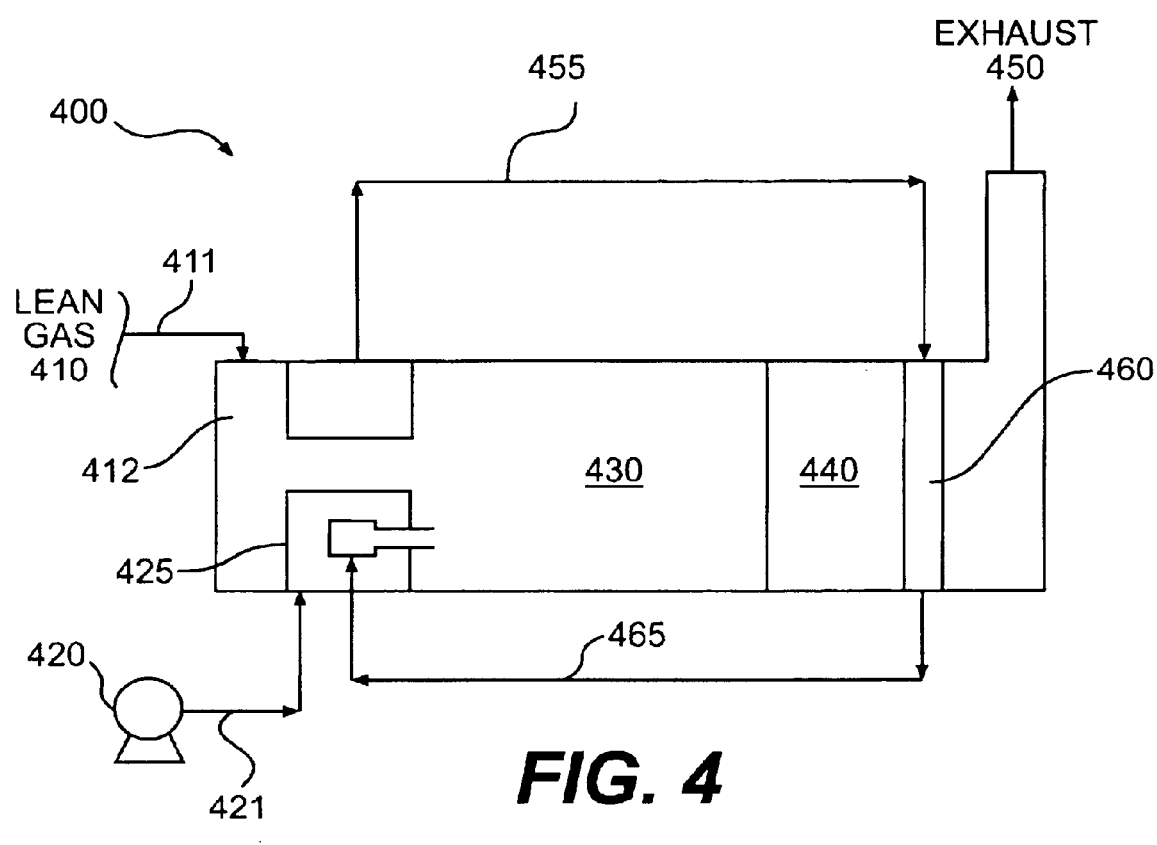
FIG. 4 is a schematic view of a superatmospheric combustion device of the present invention.

FIG. 4 is a schematic view of a superatmospheric combustion device 400 according to a first embodiment of the present invention. The combustion device 400 includes a lean gas chamber 412, a combustor 430, a heat recovery section 440, a heat exchanger 460, and an exhaust 450. Lean gas 410 is fed through a supply line 411 to the lean gas chamber 412. An air pump 420 provides pressurized inlet air through a supply line 421 to a heat sink/pressure equalization chamber 425. The air pump 420 supplies ambient air, which is at ambient temperature and pressure. Air pump 420 increases the pressure of the ambient air from about 0.1 psig to about 10.0 psig, more preferably from about 0.1 psig to about 5.0 psig. This pressurized air passes through the heat sink/pressure equalization chamber 425 and is discharged through a line 455. This pressurized air is provided to keep, for example, the metal in the combustion zone 430 cool by providing sufficient insulation and flow rate.

We have found that relatively little heat flows into the pressurized air in the heat sink/pressure equalization chamber 425. Thus, the temperature differential is minimal. In fact, we prefer that the temperature of the air leaving the heat sink/pressure equalization chamber 425 through the line 455 be not more than about 500° F., and more preferably, not exceeding about 300° F. In this manner, we have found that the apparatus remains structurally sound. The now heated air in the line 455 is supplied to the heat exchanger 460 and exits therefrom as preheated air 465 for supply to the combustor 430. The temperature of the preheated air in line 465 is about 200° F. to about 1000° F., and, more preferably, about 200° F. to about 600° F.

The parameters discussed above regarding the pressure increase to the ambient air, the temperature of the air leaving the heat sink/pressure equalization chamber, and the temperature of the preheated air for combustion are consistent throughout the embodiments described herein.

Figure 5:
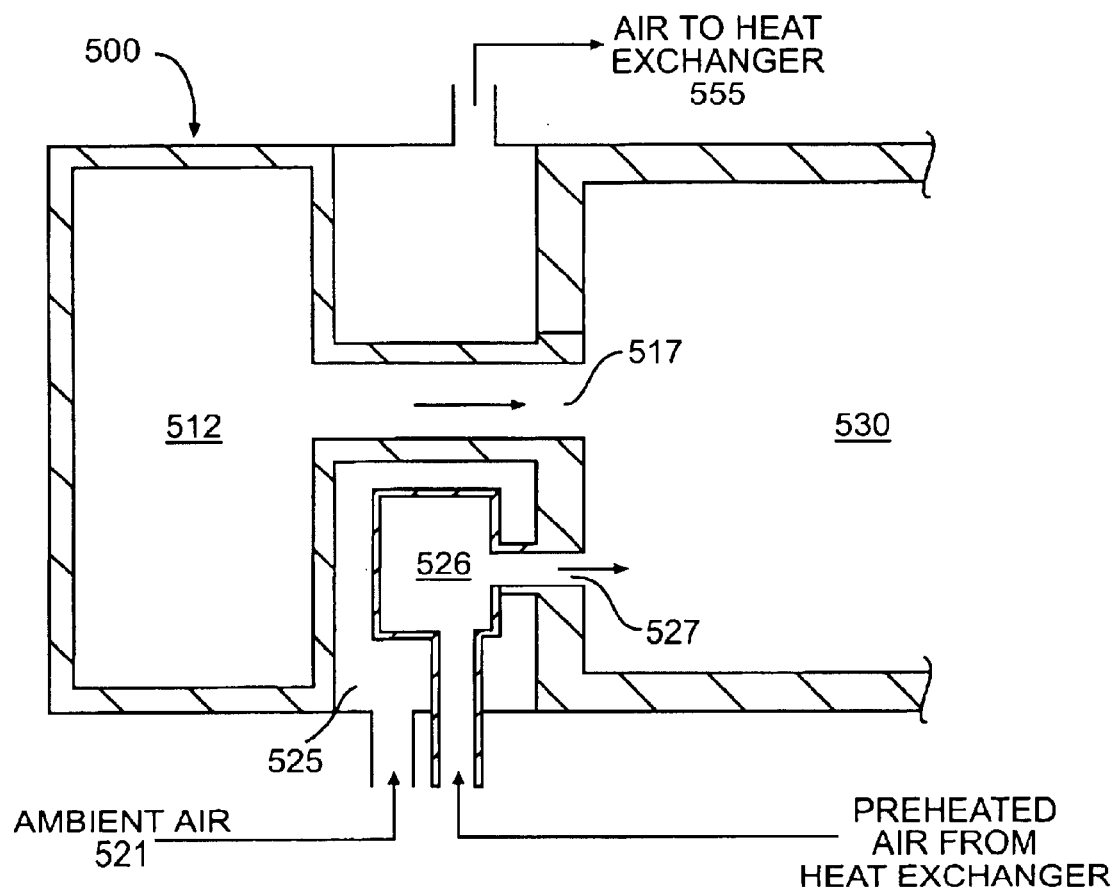
FIG. 5 is a schematic view, in cross section, showing details of a superatmospheric combustion device of the present invention.

FIG. 5 shows additional details of a combustion device 500 of the present invention. The combustion device 500 includes a lean gas chamber 512 and a combustor 530. Gas from the lean gas chamber 512 is supplied through a gas port 517 to the combustor 530. Pressurized ambient air 521 is supplied under pressure to a heat sink/pressure equalization chamber 525 where, as discussed above, the pressurized air 521 draws some heat from the lean gas chamber 512 and the combustor 530. The pressurized air exits the heat sink/pressure equalization chamber 525 through an exit 555 and is sent to a heat exchanger (not shown). Preheated air from the heat exchanger is supplied through a line 565 to a preheated air chamber 526, from where the preheated air is supplied through an air port 527 to the combustor 530. The preheated air chamber 526 is insulated in order to preserve heat and minimize pressure differentials. The preheated air chamber 526 establishes an intermediate heated air chamber, which is located within and cooled by the heat sink/pressure equalization chamber 525.

Figure 1:
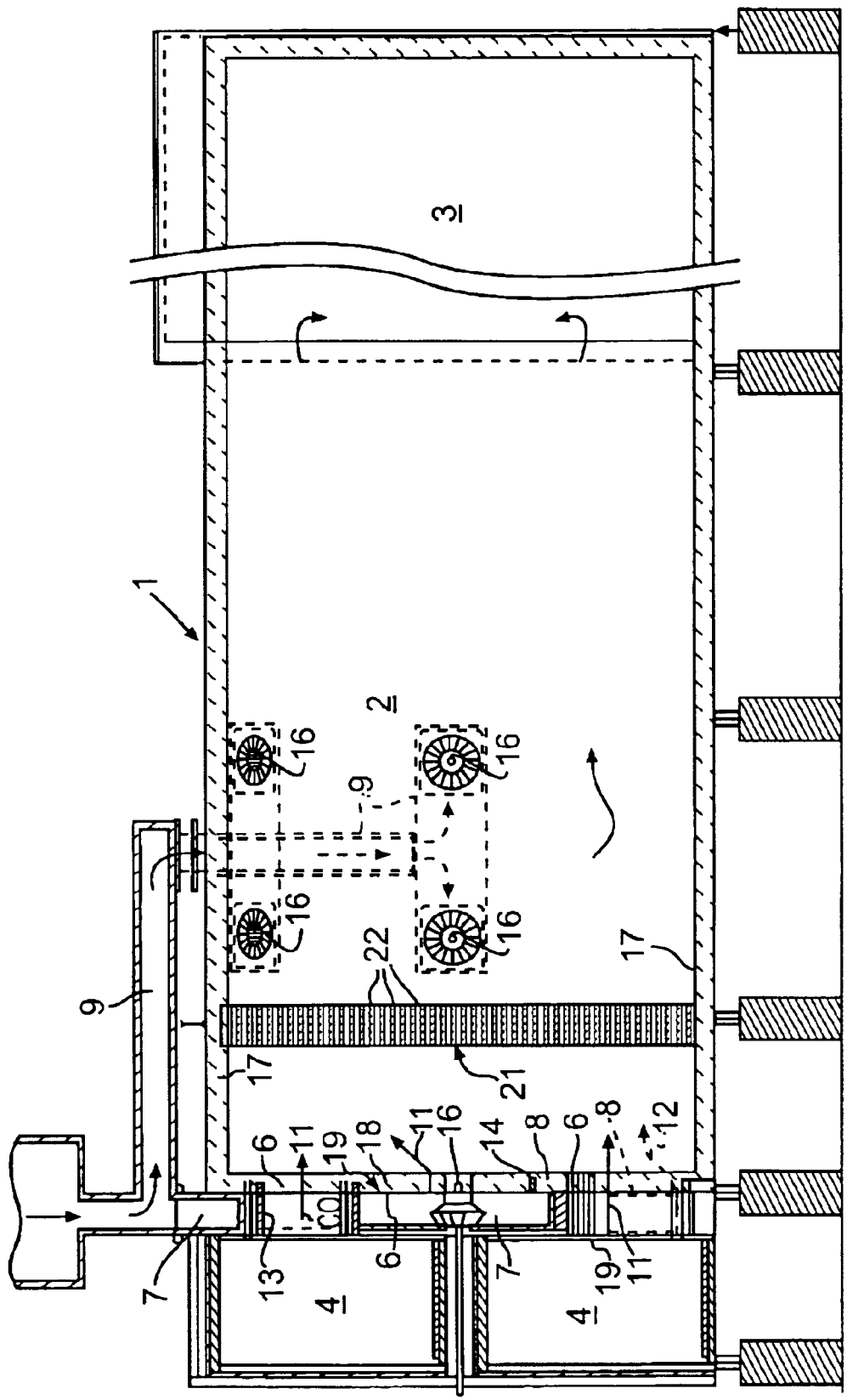
FIG. 1 is an elevation view, in cross section, of a prior art heat recovery apparatus for combusting lean concentrations of a burnable gas.
Figure 2:
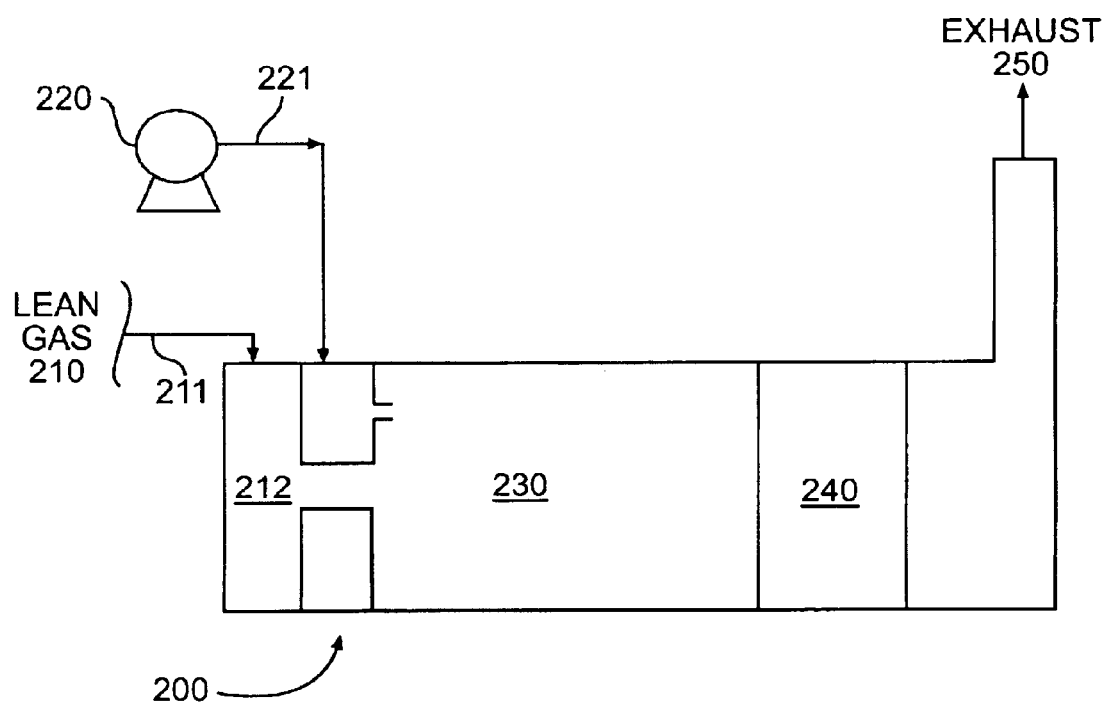
FIG. 2 is a schematic view of a conventional superatmospheric combustion device.
Figure 3:
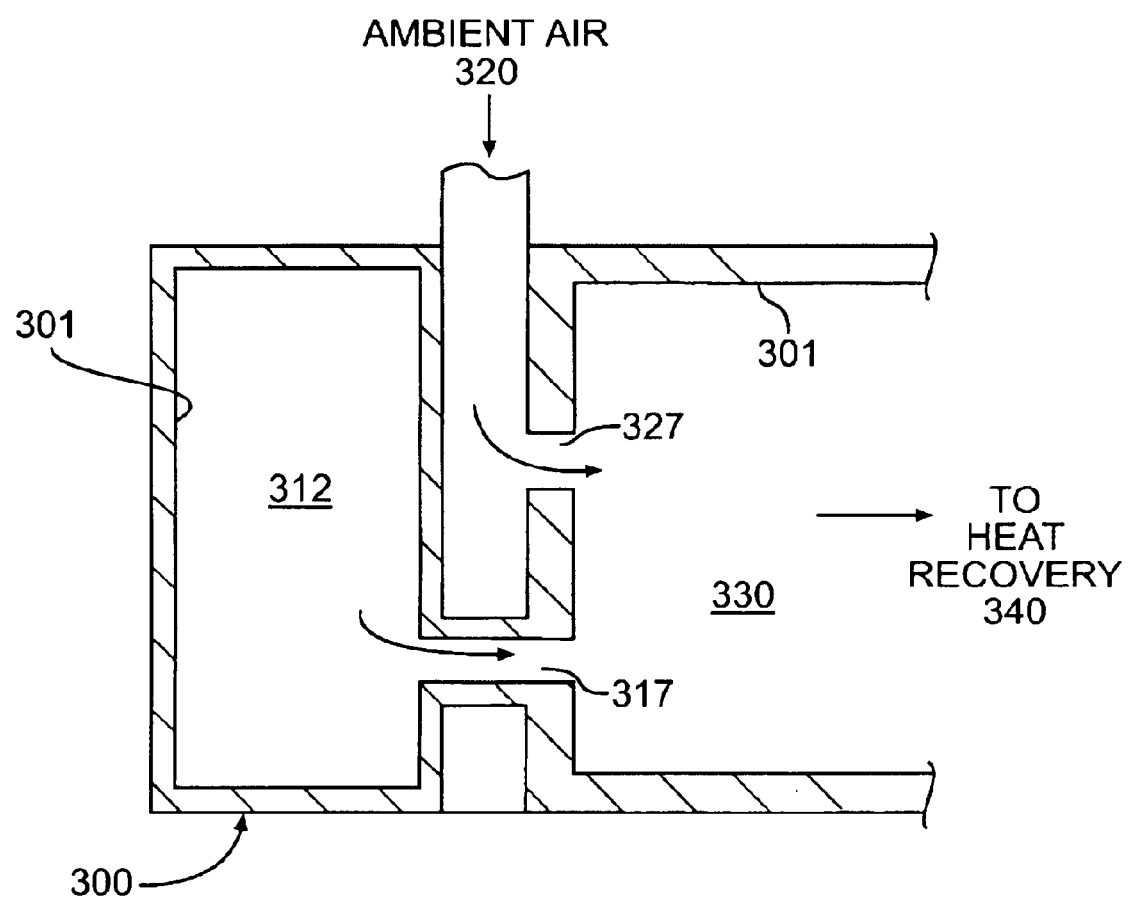
FIG. 3 is a schematic view, in cross section, showing details of a conventional superatmospheric combustion device.

In each of the embodiments of FIGS. 4–12, one having ordinary skill in the art readily will understand that, although not shown, a suitable number of auxiliary burners 16 (shown in FIG. 1) can be provided as either a start-up mechanism to initially heat the gases in the combustion zone to a desired kindling temperature and/or to maintain combustion in the event of operational variations in the composition or heat level of the fuel mixtures.

Figure 6:
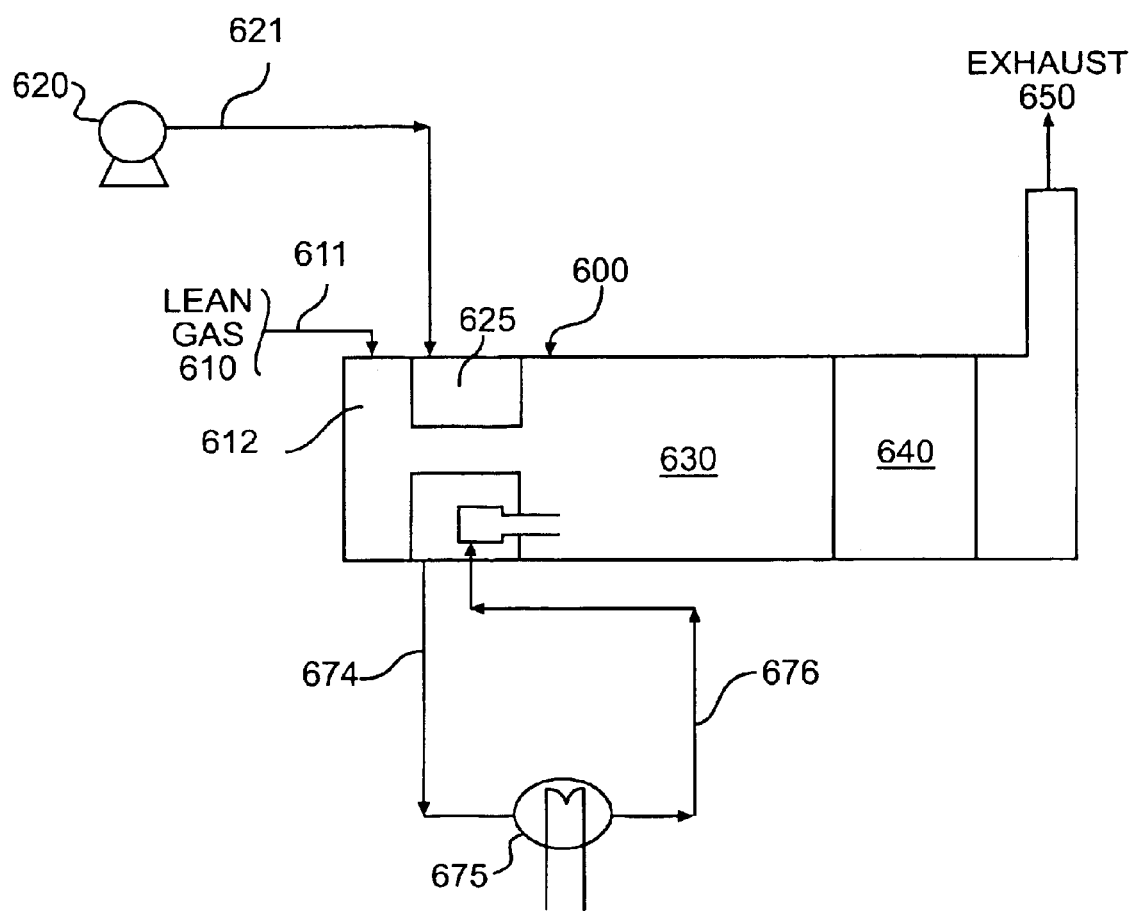
FIG. 6 is a schematic view of another embodiment of a superatmospheric combustion device of the present invention.

In the embodiments shown in FIGS. 4 and 5, the heat for the preheated air comes from the combustion device 400/500 itself. FIG. 6 shows another embodiment of the present invention, in which the heat for the preheated air comes from an auxiliary heat source.

FIG. 6 shows a combustion device 600 according to another embodiment of the present invention. The combustion device 600 includes a lean gas chamber 612, a combustor 630, a heat recovery section 640, and an exhaust 650. Lean gas 610 is fed through a line 611 to the lean gas chamber 612. Ambient air is pressurized and fed by an air pump 620 through a supply line 621 to a heat sink/pressure equalization chamber 625. From there, the heated air is discharged through a line 674 and is heated by a heat source 675 to become preheated air in a line 676 for combustion in the combustor 630. The heat source 675 may be any suitable heat source such as provided by steam or electricity, for example, from an external source, to save fuel and generate more heat recovery.

Figure 7:
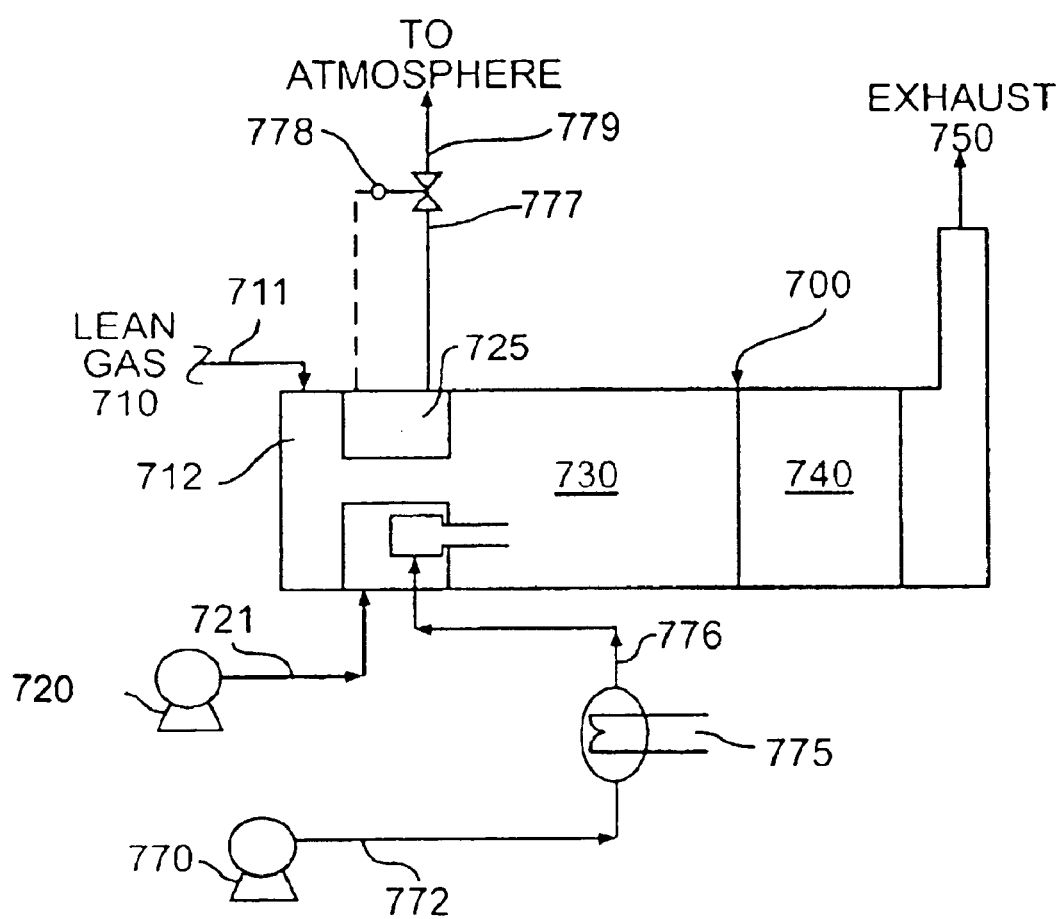
FIG. 7 is a schematic view of yet another embodiment of a superatmospheric combustion device of the present invention.

FIG. 7 shows another embodiment of a combustion device 700 according to the present invention. The combustion device 700 includes a lean gas chamber 712, a combustor 730, a heat recovery section 740, and an exhaust 750. Lean gas 710 is fed through a supply line 711 to the lean gas chamber 712. In this embodiment, two separate air supply lines are provided. Ambient air is pressurized and supplied by an air pump 720 through a supply line 721 to a heat sink/pressure equalization chamber 725. Heated air is discharged through a line 777. A pressure controller 778 is provided to control pressure in the heat sink/pressure equalization chamber 725. The heated air, in this embodiment, is finally discharged through a line 779 to the atmosphere. Meanwhile, an air pump 770 supplies pressurized ambient air through a line 772 to an auxiliary heat source 775. Preheated air in the line 776 is then supplied to the combustor 730.

Figure 8:
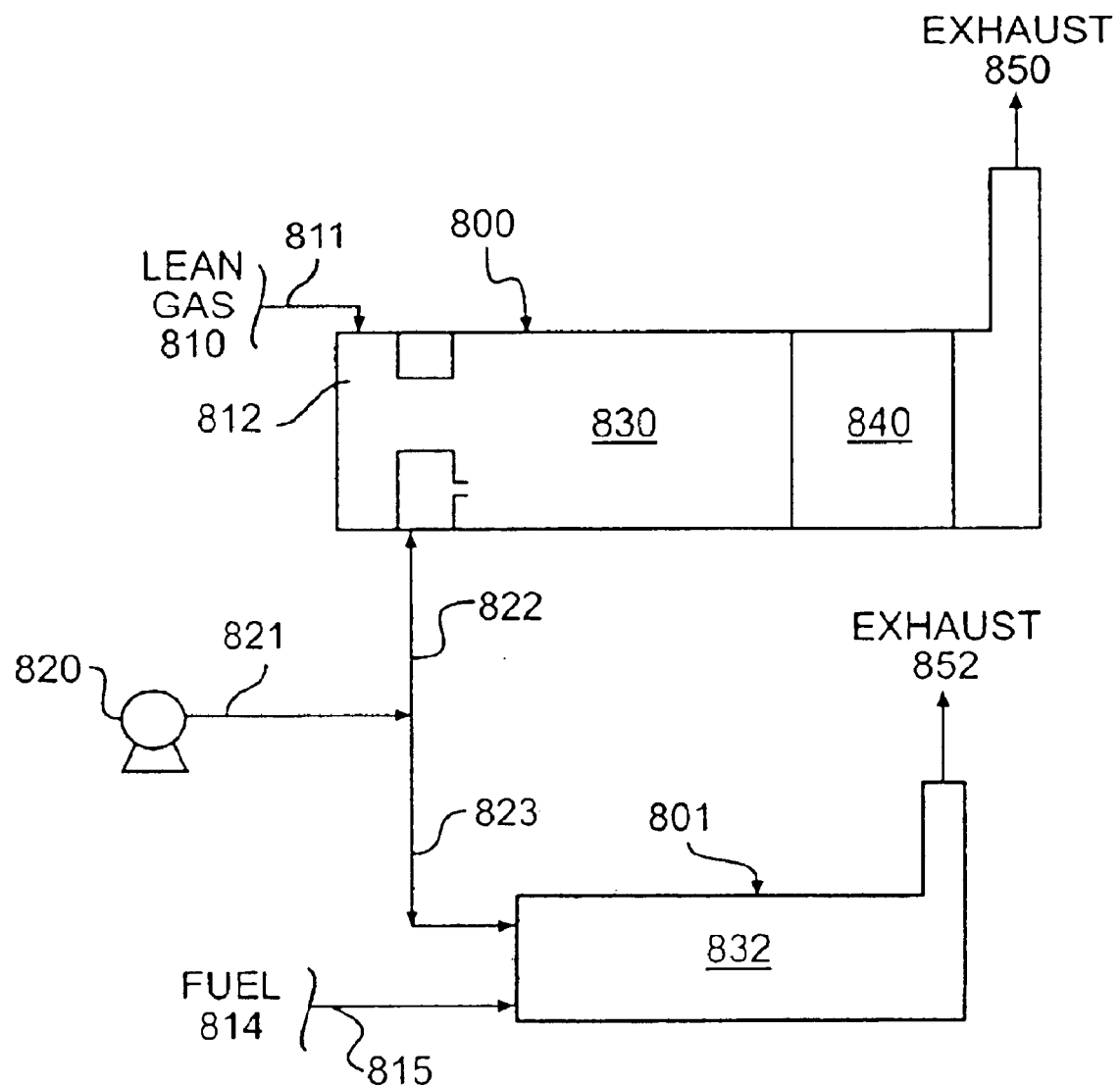
FIG. 8 is a schematic view of a conventional arrangement of two combustion devices operating in parallel.

FIG. 8 shows a conventional arrangement in which two combustion devices 800 and 801 operate in parallel. Combustion device 800 includes a lean gas chamber 812, a combustor 830, a heat recovery section 840, and an exhaust 850. Lean gas 810 is supplied through a supply line 811 to the lean gas chamber 812. Combustion device 801 includes a combustor 832 and an exhaust 852. Fuel 814 is supplied through a line 815 to the combustor 832 of combustion device 801. Ambient air is supplied from an air pump 820 to both of the combustion devices 800 and 801. The air pump 820 supplies pressurized air through a line 821, which branches into supply lines 822 and 823. Supply line 822 feeds combustion air to the combustor 830 of combustion device 800, whereas supply line 823 feeds combustion air to the combustor 832 of combustion device 801.

Figure 9:
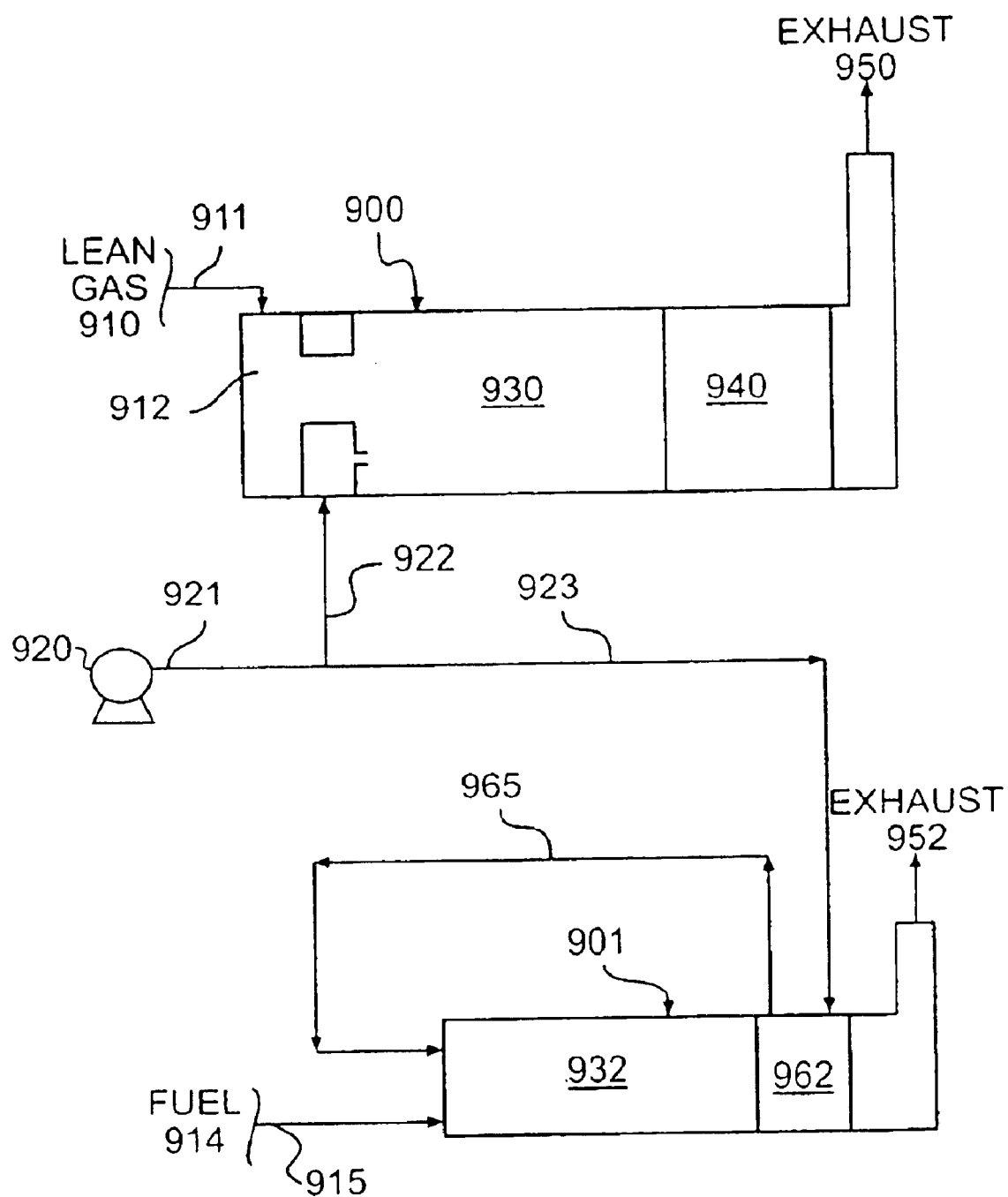
FIG. 9 is a schematic view of yet another conventional arrangement of two combustion devices operating in parallel.

FIG. 9 shows another conventional arrangement of combustion devices 900 and 901 operating in parallel. In this embodiment, combustion device 901 has a heat recovery arrangement for preheating air for itself.

Combustion device 900 includes a lean gas chamber 912, a combustor 930, a heat recovery section 940, and an exhaust 950. Lean gas 910 is fed through a supply line 911 to the lean gas chamber 912. Combustion device 901 includes a combustor 932, a heat exchanger 962, and an exhaust 952. Fuel 914 is fed through a supply line 915 to the combustor 932. Pressurized ambient air is supplied from an air pump 920 through a supply line 921, which branches into supply lines 922 and 923. Supply line 922 supplies combustion air to the combustor 930, whereas supply line 923 supplies air to the heat exchanger 962. Heat is exchanged in heat exchanger 962 to provide preheated air 965 for combustion in the combustor 932.

Figure 10:
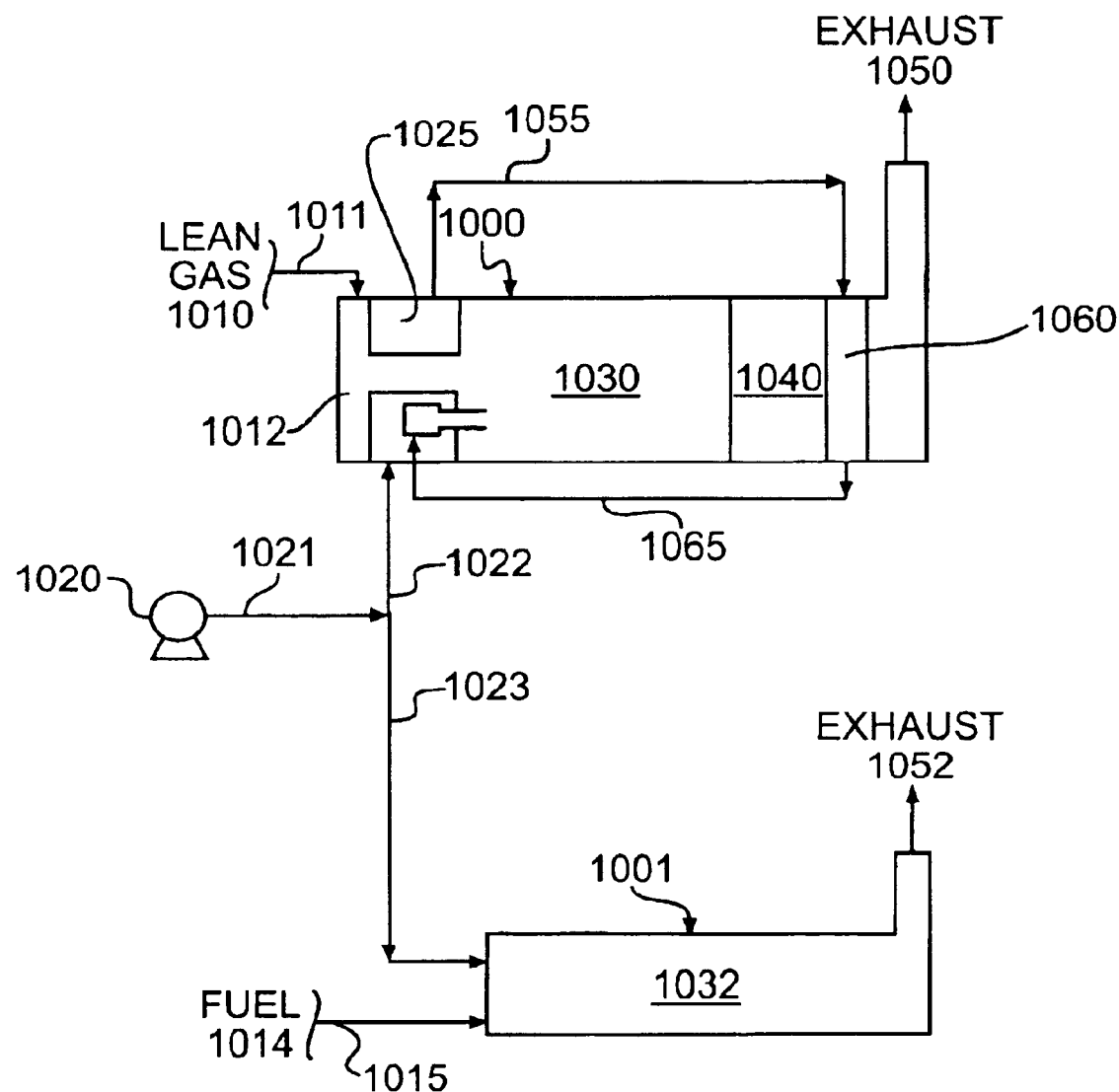
FIG. 10 is a schematic view of another embodiment of a superatmospheric combustion device of the present invention.

FIG. 10 shows another embodiment of the present invention as applied to two combustion devices 1000 and 1001. Combustion device 1000 includes a lean gas chamber 1012, a combustor 1030, a heat recovery section 1040, a heat exchanger 1060, and an exhaust 1050. Lean gas 1010 is supplied through a supply line 1011 to a lean gas chamber 1012. Combustion device 1001 includes a combustor 1032 and an exhaust 1052. Fuel 1014 is supplied through a supply line 1015 to combustion device 1001 for combustion in the combustor 1032. An air pump 1020 supplies pressurized ambient air through a supply line 1021, which branches into supply lines 1022 and 1023. Supply line 1023 supplies ambient air to the combustor 1032. Supply line 1022 supplies air to a heat sink/pressure equalization chamber 1025. Slightly heated air exits the heat sink/pressure equalization chamber 1025 through a line 1055 and is sent to the heat exchanger 1060. Preheated air exits the heat exchanger 1060 in a line 1065 and is supplied to the combustor 1030.

Figure 11:
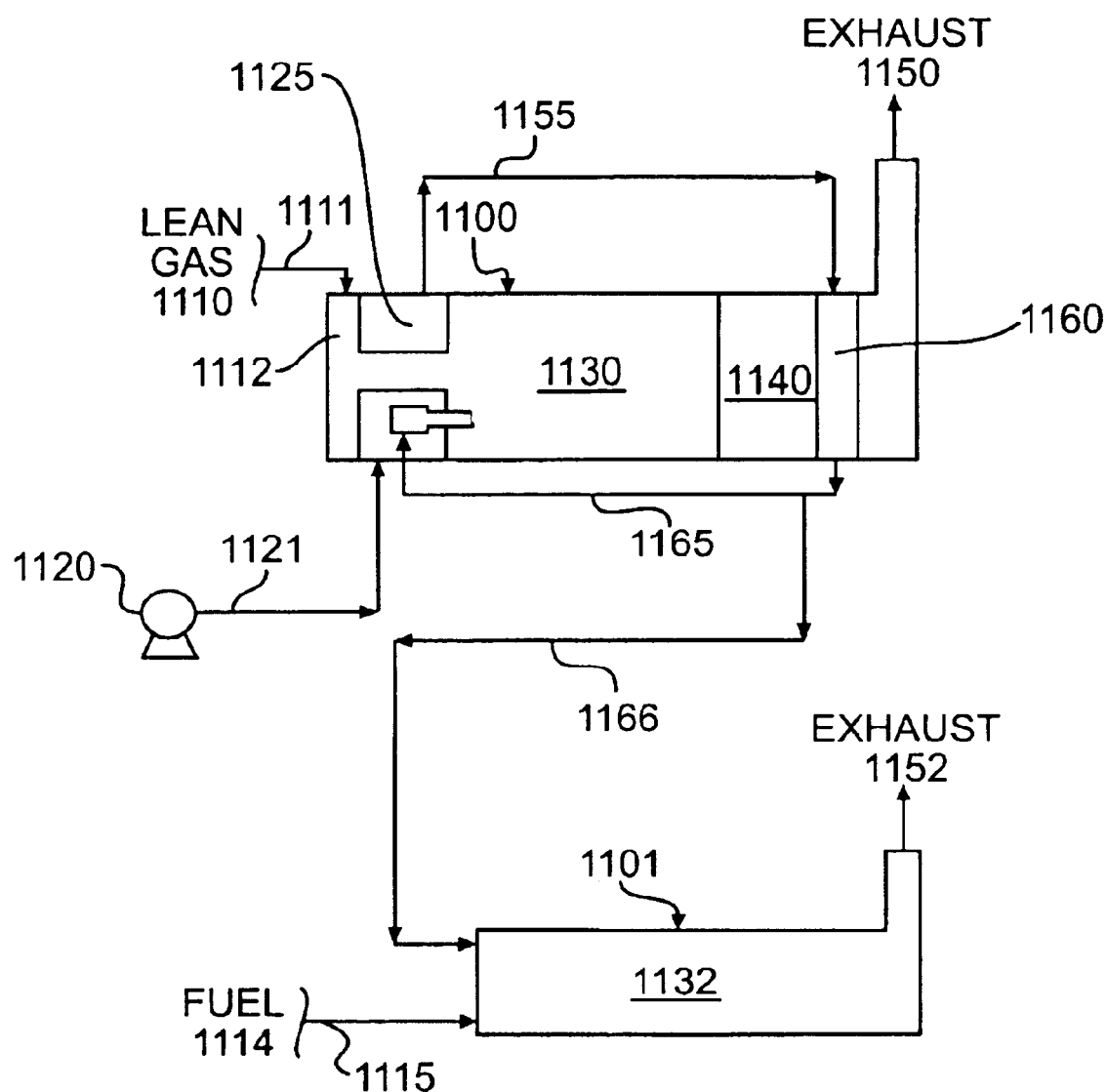
FIG. 11 is a schematic view of yet another embodiment of a superatmospheric combustion device of the present invention.

FIG. 11 shows an arrangement in which two combustion devices 1100 and 1101 operate in parallel. Combustion device 1100 includes a lean gas chamber 1112, a combustor 1130, a heat recovery section 1140, a heat exchanger 1160, and an exhaust 1150. Lean gas 1110 is supplied through a supply line 1111 to the lean gas chamber 1112. Combustion device 1101 includes a combustor 1132 and an exhaust 1152. Fuel 1114 is supplied through a line 1115 to the combustor 1132.

An air pump 1120 supplies pressurized ambient air through a line 1121 to a heat sink/pressure equalization chamber 1125. Slightly heated air exits the heat sink/pressure equalization chamber 1125 through a line 1155 and is sent to the heat exchanger 1160. The heat exchanger 1160 provides preheated air in lines 1165 and 1166. Preheated air in line 1165 is sent to combustor 1130. Preheated air in line 1166 is sent to combustor 1132.

Figure 12:
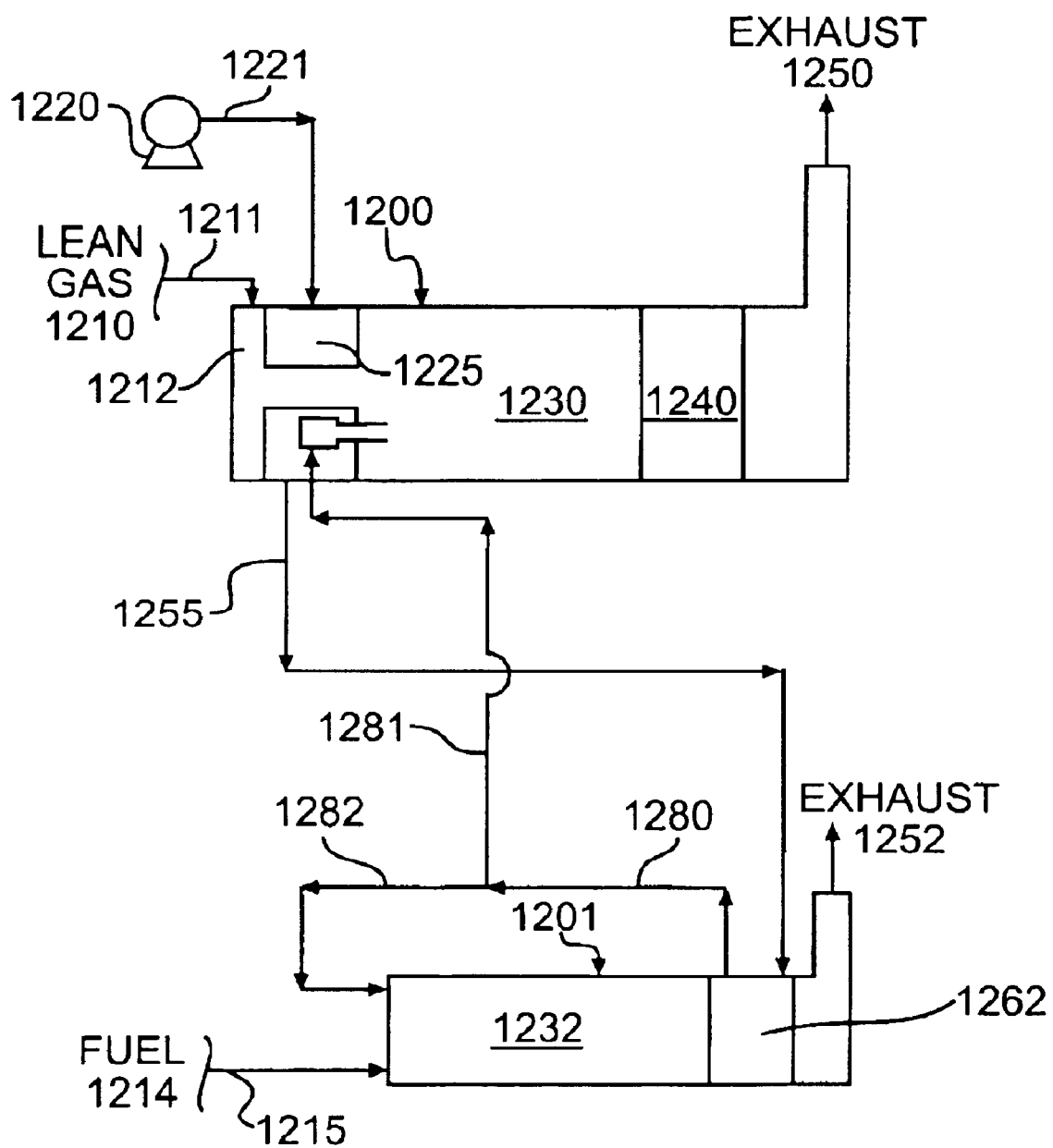
FIG. 12 is a schematic view of still another embodiment of a superatmospheric combustion device of the present invention.

FIG. 12 shows yet another embodiment of the present invention when utilized with two combustion devices 1200 and 1201 operating in parallel. Combustion device 1200 includes a lean gas chamber 1212, a combustor 1230, a heat recovery section 1240, and an exhaust 1250. Combustion device 1201 includes a combustor 1232, a heat exchanger 1262, and an exhaust 1252. Fuel 1214 for combustion device 1201 is fed through a supply line 1215 to the combustor 1232.

Lean gas 1210 for combustion in combustion device 1200 is fed through a line 1211 to the lean gas chamber 1212. An air pump 1220 feeds pressurized ambient air through a supply line 1221 into a heat sink/pressure equalization chamber 1225. Slightly warmed air from the heat sink/pressure equalization chamber 1225 is sent through a line 1255 to a heat exchanger 1262 of combustion device 1201. Preheated air in line 1280 exits the heat exchanger 1262. This preheated air is fed through a supply line 1281 to the combustor 1230 of combustion device 1200 and through a supply line 1282 to the combustor 1232 of combustion device 1201, respectively.

Except as otherwise disclosed herein, the various components shown in outline or in block form in the figures are individually well known and their internal construction and operation are not critical either to the making or using of this invention or to a description of the best mode of the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Industrial Applicability

The superatmospheric combustion apparatus and method of operating the same that are disclosed herein can be utilized in the combustion of lean concentrations of a burnable gas. The apparatus includes a superatmospheric combustion device having a lean gas chamber, a combustor, a heat recovery section, and an exhaust, a lean gas feed for feeding lean gas to the lean gas chamber, a heat sink/pressure equalization chamber and a preheated air chamber within the combustion device, a pressurized ambient air feed for feeding pressurized ambient air to the heat sink/pressure equalization chamber, a preheated air feed for feeding preheated air to the preheated air chamber, a lean gas port for feeding the lean gas from the lean gas chamber to the combustor; and a preheated air port for feeding the preheated air from the preheated air chamber to the combustor. The heat sink/pressure equalization chamber exchanges heat from the lean gas chamber, the preheated air chamber, and the combustor to the pressurized ambient air in the heat sink/pressure equalization chamber. The lean gas and the preheated air are combusted in the combustor at superatmospheric pressure.

We claim:

1. A method of operating a superatmospheric combustion device, the method comprising:

providing a superatmospheric combustion device, which includes a lean gas chamber, a combustor, a heat recovery section, and an exhaust;

feeding lean gas to the lean gas chamber;

providing a heat sink/pressure equalization chamber and a preheated air chamber within the combustion device;

feeding pressurized ambient air to the heat sink/pressure equalization chamber;

feeding preheated air, which is higher in temperature than the ambient air, to the preheated air chamber;

exchanging heat from the lean gas chamber, the preheated air chamber, and the combustor to the pressurized ambient air in the heat sink/pressure equalization chamber;

feeding the lean gas from the lean gas chamber to the combustor;

feeding the preheated air from the preheated air chamber to the combustor; and combusting the lean gas and the preheated air in the combustor at superatmospheric pressure.

2. A method according to claim 1, wherein the preheated air chamber is nested within the heat sink/pressure equalization chamber.

3. A method according to claim 1, further comprising pressurizing the ambient air to a pressure of about 0.1 psig to about 10.0 psi.

4. A method according to claim 3, wherein the ambient air is pressurized to a pressure of about 0.1 psig to about 5.0 psig.

5. A method according to claim 1, further comprising preheating the preheated air to a temperature of about 200° F. to about 1000° F.

6. A method according to claim 5, wherein the preheated air is preheated to a temperature of about 200° F. to about 600° F.

7. A method according to claim 1, wherein the heat exchanging step comprises increasing the temperature of the pressurized ambient air exiting the heat sink/pressure equalization chamber to a temperature of not more than about 500° F.

8. A method according to claim 1, wherein the heat exchanging step comprises increasing the temperature of the pressurized ambient air exiting the heat sink/pressure equalization chamber to a temperature of not more than about 300° F.

9. A method according to claim 1, further comprising preheating the preheated air using a heat exchanger in the heat recovery section of the combustion device.

10. A method according to claim 9, further comprising discharging the pressurized ambient air from the heat sink/pressure equalization chamber and feeding the discharged air to the heat exchanger.

11. A method according to claim 1, further comprising preheating the preheated air using a heat source external to the combustor device.

12. A method according to claim 11, further comprising discharging the pressurized ambient air from the heat sink/pressure equalization chamber and feeding the discharged air to the external heat source.

13. A superatmospheric combustion apparatus, comprising:

a superatmospheric combustion device including a lean gas chamber, a combustor, a heat recovery section, and an exhaust;

a lean gas feed for feeding lean gas to the lean gas chamber;

a heat sink/pressure equalization chamber and a preheated air chamber within the combustion device;

a pressurized ambient air feed for feeding ambient air to the heat sink/pressure equalization chamber;

a preheated air feed for feeding preheated air, which is higher in temperature than the ambient air, to the preheated air chamber;

a lean gas port for feeding the lean gas from the lean gas chamber to the combustor; and a preheated air port for feeding the preheated air from the preheated air chamber to the combustor, wherein the heat sink/pressure equalization chamber exchanges heat from the lean gas chamber, the preheated air chamber, and the combustor to the pressurized ambient air in the heat sink/pressure equalization chamber and the lean gas, and the preheated air are combusted in the combustor at superatmospheric pressure.

14. An apparatus according to claim 13, wherein the preheated air chamber is nested within the heat sink/pressure equalization chamber.

15. An apparatus according to claim 13, further comprising an air pump for pressurizing the ambient air to a pressure of about 0.1 psig to about 10.0 psig.

16. An apparatus according to claim 15, wherein the ambient air is pressurized to a pressure of about 0.1 psig to about 5.0 psig.

17. An apparatus according to claim 13, further comprising a preheater for preheating the preheated air to a temperature of about 200° F. to about 1000° F.

18. An apparatus according to claim 17, wherein the preheated air is preheated to a temperature of about 200° F. to about 1000° F.

19. An apparatus according to claim 13, wherein the heat sink/pressure equalization chamber increases the temperature of the pressurized ambient air exiting the heat sink/pressure equalization chamber to a temperature of not more than about 500° F.

20. An apparatus according to claim 13, wherein the heat sink/pressure equalization chamber increases the temperature of the pressurized ambient air exiting the heat sink/pressure equalization chamber to a temperature of not more than about 300° F.

21. An apparatus according to claim 13, further comprising a heat exchanger in the heat recovery section of the combustion device for preheating the preheated air.

22. An apparatus according to claim 21, further comprising a discharge for discharging the pressurized ambient air from the heat sink/pressure equalization chamber and a feed for feeding the discharged air to the heat exchanger.

23. An apparatus according to claim 13, further comprising a heat source external to the combustion device for preheating the preheated air.

24. An apparatus according to claim 23, further comprising a discharge for discharging the pressurized ambient air from the heat/sink pressure equalization chamber and a feed for feeding the discharged air to the extreme heat source.

25. A method of operating a superatmospheric combustion device, the method comprising:

providing a superatmospheric combustion device, which includes a lean gas chamber, a combustor, a heat recovery section, and an exhaust;

feeding lean gas to the lean gas chamber;

providing a heat sink/pressure equalization chamber and a preheated air chamber within the combustion device, the preheated air chamber being located within and cooled by the heat sink/pressure equalization chamber;

feeding pressurized ambient air to the heat sink/pressure equalization;

feeding preheated air to the preheated air chamber;

exchanging heat from each of the lean gas chamber, the preheated air chamber, and the combustor to the pressurized ambient air in the heat sink/pressure equalization chamber, feeding the lean gas from the lean gas chamber to the combustor;

feeding the preheated air from the preheated air chamber to the combustor; and combusting the lean gas and the preheated air in the combustor at superatmospheric pressure.

26. A superatmospheric combustion apparatus, comprising:

a superatmospheric combustion device including a lean gas chamber, a combustor, a heat recovery section, and an exhaust;

a lean gas feed for feeding lean gas to the lean gas chamber;

a heat sink/pressure equalization chamber and a preheated air chamber within the combustion device, the preheated air chamber being located within and cooled by the heat sink/pressure equalization chamber;

a pressurized ambient air feed for feeding pressurized ambient air to the heat sink/pressure equalization chamber;

a preheated air feed for feeding preheated air to the preheated air chamber;

a lean gas port for feeding the lean gas from the lean gas chamber to the combustor; and a preheated air port for feeding the preheated air from the preheated air chamber to the combustor, wherein the heat sink/pressure equalization chamber exchanges heat from each of the lean gas chamber, the preheated air chamber, and the combustor to the pressurized ambient air in the heat sink/pressure equalization chamber, and the lean gas and the preheated air are combusted in the combustor at superatmospheric pressure.

27. A method of operating a superatmospheric combustion device, the method comprising:

providing a superatmospheric combustion device, which includes a lean gas chamber, a combustor, a heat recovery section, and an exhaust;

feeding lean gas to the lean gas chamber;

providing a heat sink/pressure equalization chamber and a preheated air chamber within the combustion device;

feeding pressurized ambient air to the heat sink/pressure equalization;

feeding preheated air to the preheated air chamber;

exchanging heat from the lean gas chamber, the preheated air chamber, and the combustor to the pressurized ambient air in the heat sink/pressure equalization chamber;

feeding the lean gas from the lean gas chamber to the combustor;

feeding the preheated air from the preheated air chamber to the combustor; and combusting the lean gas and the preheated air in the combustor at superatmospheric pressure, wherein the combustion device is cooled free from supplying ambient air to the combustor.

28. A superatmospheric combustion apparatus, comprising:

a superatmospheric combustion device including a lean gas chamber, a combustor, a heat recovery section, and an exhaust;

a lean gas feed for feeding lean gas to the lean gas chamber;

a heat sink/pressure equalization chamber and a preheated air chamber within the combustion device;

a pressurized ambient air feed for feeding pressurized ambient air to the heat sink/pressure equalization chamber;

a preheated air feed for feeding preheated air to the preheated air chamber;

a lean gas port for feeding the lean gas from the lean gas chamber to the combustor; and a preheated air port for feeding the preheated air from the preheated air chamber to the combustor, wherein the heat sink/pressure equalization chamber exchanges heat from the lean gas chamber, the preheated air chamber, and the combustor to the pressurized ambient air in the heat sink/pressure equalization chamber, and the lean gas and the preheated air are combusted in the combustor at superatmospheric pressure, wherein the combustion device is cooled free from supplying ambient air to the combustor.

* * * * *